Sept. 14, 1948. F. G. FERGUSON ET AL 2,449,375
SHAFT SEAL
Filed Feb. 26, 1945
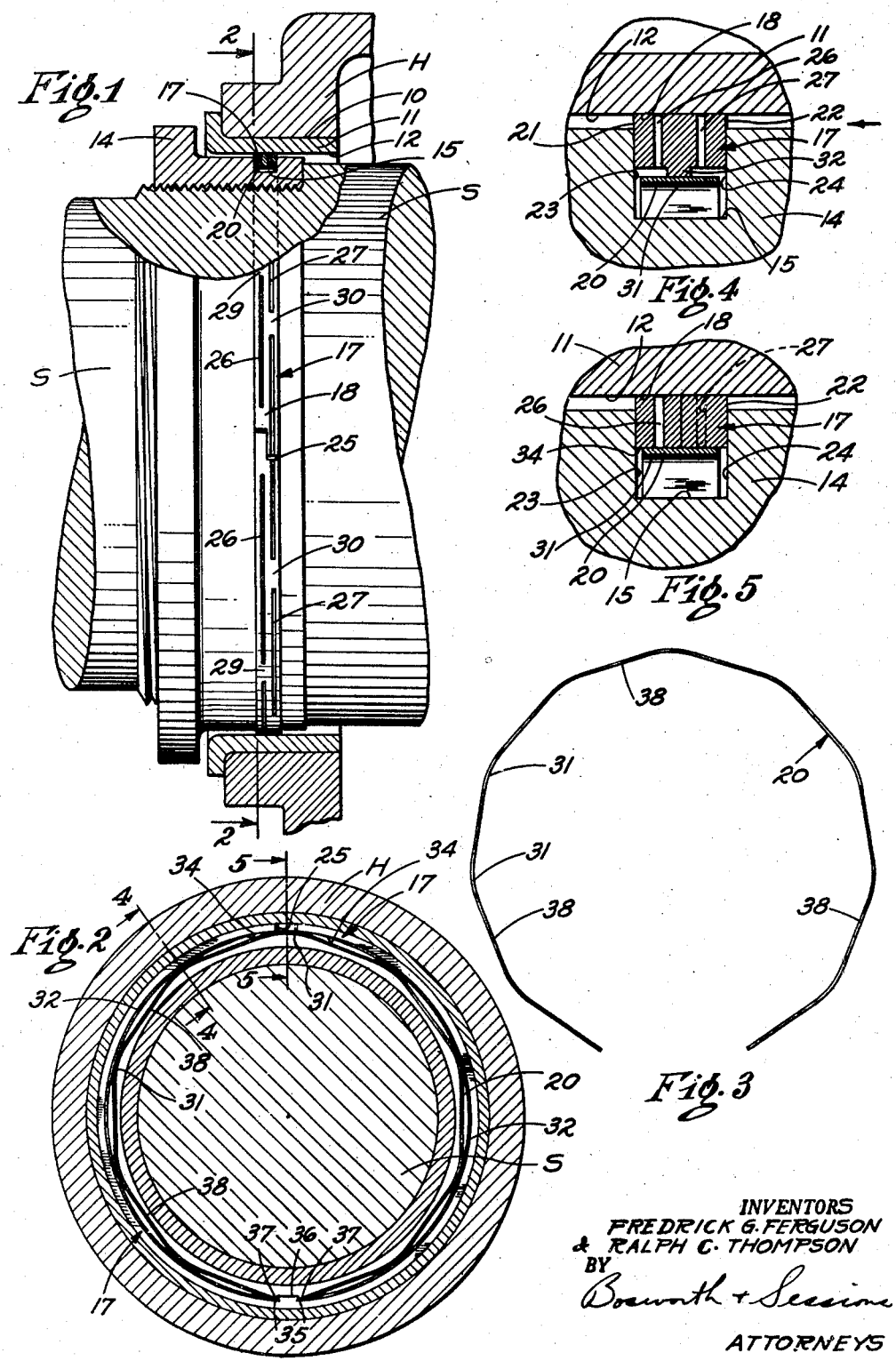
INVENTORS
FREDRICK G. FERGUSON
& RALPH C. THOMPSON
BY
Bosworth + Sessions
ATTORNEYS Patented Sept. 14, 1948

2,449,375

UNITED STATES PATENT OFFICE 2,449,375

SHAFT SEAL

Fredrick G. Ferguson, Shaker Heights, and Ralph C. Thompson, Cleveland Heights, Ohio, assignors to Simplex Piston Ring Mfg. Company, a corporation of Ohio Application February 26, 1945, Serial No. 579,758

1 Claim. (Cl. 286—11.16)

This invention relates to seals for preventing fluid from leaking between a rotating shaft and an opening in a member with respect to which the shaft rotates and through which the shaft projects. Heretofore many such seals have been made of leather or flexible synthetic materials, and while they have been reasonably effective under some conditions of operation, they have not been satisfactory at high rotational or lineal speeds and under severe operating conditions such as those encountered in modern aircraft power plant installations. Existing types of seals have been short lived and have been a frequent source of trouble when installed on aircraft engine propeller shafts, for example, which are subject to severe vibration conditions and which are exposed to wide changes in the temperature.

A general object of the present invention, therefore, is the provision of a simple, durable and effective seal which will prevent substantial leakage along a rotating shaft or between a shaft and a housing and which will be long lived under severe operating conditions. Another object is the provision of such a seal which can be constructed entirely of metal and wherein there will be little if any wear and little tendency to heat up in service. Another object is the provision of a seal which will stand up under severe conditions of vibration. Another object is the provision of a seal which will be effective under widely varying temperature conditions. A further object is the provision of a light and compact seal of this character.

Further objects and advantages of the invention will become apparent from the following description of a preferred form thereof, reference being made to the accompanying drawings in which Figure 1 is an axial sectional view showing a portion of a housing with a shaft extending therethrough and with a seal embodying the present invention disposed on the shaft; Figure 2 is a transverse sectional view of the installation shown in Figure 1, the section being taken along the line 2—2 of Figure 1 and illustrating the sealing elements themselves in end elevation; Figure 3 is an end elevation showing one of the elements of the seal as it appears before assembly; and Figures 4 and 5 are sectional details on an enlarged scale, the sections being taken as indicated by the lines 4—4 and 5—5, respectively, of Figure 2.

As shown in the drawing, the seal may be employed to block the flow of fluid through the clearance space between the shaft S and the housing H, the shaft being rotatable with respect to the housing. The term "housing" as used herein is intended to include any member, such as a casing, journal bearing, boss, or the like, from which a rotatable shaft may project, and the housing itself may rotate. The housing has an opening 10 through which the shaft projects, and preferably, although not necessarily, a liner or sleeve member 11 is disposed within the opening 10, the internal cylindrical surface 12 of the liner or sleeve member constituting one of the surfaces against which the seal is made. The liner or sleeve 11 may be pressed into the opening 10 or otherwise suitably secured therein.

The shaft S preferably, but again not necessarily, is provided with a carrier 14 which may be threaded thereon as shown in the drawing, or otherwise suitably mounted for rotation with the shaft and which is provided with a groove 15 within which the elements of the seal itself are disposed. It is preferable to employ a sleeve 11 and a carrier 14, for these relatively small parts can be made with high degrees of accuracy and the requisite surface finishes at relatively low cost, and may be composed of materials selected with respect to their functions in the seal, whereas the shaft and the housing may be composed of materials which are best suited for their principal functions, but may not be as well suited for functioning with the seal. However, it is to be understood that if desired, the groove for receiving the seal may be formed directly in the shaft, and the inner surface of the opening 10 of the housing may be arranged to engage the sealing member itself.

A sleeve 11 and carrier 14 are disposed in leak proof relationship with the housing and shaft, respectively, and thus the specific function of the sealing member in the embodiment shown is to prevent leakage along the clearance space between the sleeve and the carrier. In order to block the clearance space, we preferably employ a one piece, transversely split, axially resilient sealing ring 17 disposed within the groove 15 and having its outer cylindrical surface 18 in engagement with the inner cylindrical surface 12 of the sleeve 11. The sealing ring 17 is expanded into firm sealing engagement with the cylindrical surface 12 by the expander spring 20; by reason of the axial resilience of the ring, its end faces 21 and 22 make running seals with the radial surfaces 23 and 24, respectively, which constitute the end walls of the groove 15 in the carrier 14. The engagement of the various sealing surfaces is best illustrated in Figure 4. As there shown, engagement of the radial surfaces prevents fluid from flowing along the clearance space into the groove 15 and around the sealing ring 17, while the engagement of the cylindrical surface 18 of the ring 17 with the inner cylindrical surface 12 blocks the flow of fluid on the outside of the ring 17.

The successful operation of the seal depends upon the proper construction and arrangement of the sealing ring 17 and the expander spring 20. As noted above, the sealing ring is axially resilient, and to obtain a unitary ring having the required axial resilience, the ring is preferably constructed generally in accordance with the teachings of the prior patent of Dean M. Solenberger, No. 1,574,634, issued February 23, 1926. As shown particularly in Figure 2, the ring is preferably provided with a stepped transverse cut as indicated at 25 and as shown in Figures 1 and 4 has two rows or series of saw cuts 26 and 27. These cuts, which extend all the way through the ring in radial directions, are arranged to leave small staggered intervening portions 29 and 30, thus providing a resilient structure which is very compact and which acts with substantially uniform force in axial directions at all points of its circumference. Preferably, the rings are composed of close grain cast iron such as employed in piston rings for internal combustion engines because of the desirable frictional characteristics of this material, and because of the material's demonstrated ability to withstand severe conditions of operation and wide variations in temperature without failure. The ring is compressed slightly in an axial direction when it is inserted in the groove 15, and thus the inherent tension of the ring provides the initial sealing engagement between the end surfaces of the ring and the radial surfaces 23 and 24 of the groove.

In order to expand the sealing ring 17 into firm sealing engagement with the inner cylindrical surface 12 of the sleeve 11, the expander spring 20 is employed. This preferably comprises a strip of flat spring steel slightly narrower than the ring 17 and bent into the generally polygonal form shown in the drawing. The rounded corner portions 31 of the expander spring 20 engage the inner surface of the ring 17 to urge it outwardly. Preferably the inner surface of the ring 17 is provided with an inwardly extending bead or projection 32 for engagement with the spring; by the provision of the bead 32, the possibility of the expander spring hampering or reducing the axial resilience of the sealing ring 17 is substantially eliminated. A similar result can be obtained by providing the spring with a convex outer surface, as by forming it of wire having a convex surface. In either event, the engagement between the expander and the ring 17 is in the portion between the rows of slots and the axial resilience of the ring is not impaired. The bead 32 preferably extends throughout the ring 17, except in the region adjacent the transverse split 25 where the inner surface of the ring is ground to an arcuate shape as at 34 to conform to the adjacent portion 31 of the expander spring 20, and in the opposite region where the bead is cut away as at 35, leaving a portion 36 which acts as an abutment for the ends 37 of the spring 20. The engagement of the curved portion 31 with the correspondingly curved portion 34 of the ring 17 in the region adjacent the gap 25 blocks the slots 26 and 27 in this region as shown particularly in Figure 5 and substantially reduces the possibility of leakage of fluid at the gap. The engagement of the ends 37 with the abutment 36 makes it possible for the relatively light spring 20 to exert the required expansive force upon the ring 17 without necessitating any internal support for the spring 20. Thus, as shown in Figure 2, the intermediate, substantially straight portions 38 of the spring, do not engage the bottom wall of the groove 15.

The spring 20 is dimensioned with respect to the inner circumference of the ring 17 so that it acts to expand the ring firmly outwardly against the sealing surface 12. The parts are assembled preferably by placing the expander spring 20 within the groove, then installing the ring 17 in the groove 15 by springing the ring outwardly slightly so that it can be snapped over the adjacent cylindrical surfaces of the carrier, then the ring is compressed in an axial direction and allowed to snap into the groove 15 with the ends of the expander in engagement with the lug or abutment 36. Thereafter, the ring may be radially compressed against the expansion of the spring 20, and the parts assembled to the position shown in Figure 1. In operation the tension of the expander spring 20 is preferably such that the ring 17 remains stationary with respect to the sleeve 11 or creeps slowly with respect thereto; i. e., the ring remains substantially stationary. However, the ring is slideable in axial directions with respect to the sleeve to permit longitudinal movement of the shaft S. The end faces of the ring are in running sealing engagement with the radial walls 23 and 24 of the groove. The expander spring remains substantially out of contact with the walls of the groove as shown in Figures 2 and 4.

With this arrangement the only running seals are between the end faces of the ring and the radial walls 23 and 24. In order to secure the proper fit and long wear of these surfaces, the member 14 is preferably made of hardened steel with ground surfaces, while the ring 17 is preferably given a light silver or lead plating so that it will wear in properly. The resilient character of the ring provides an initial seal even when there is no fluid pressure and also permits the seal to compensate automatically for any slight amount of wear that may take place.

Pressure applied to the seal, in the direction of the arrow of Figure 4, for example, tends to urge the seal into firmer sealing engagement with the low pressure side of the groove, i. e., the surface 23 in the drawing. It is to be noted, however, that if in the example given, fluid should leak between the surfaces 22 and 24 and into the groove 15, then the pressure of the fluid within the groove acting on the inner surfaces of the slots 26 and 27 tends to increase the axial expansive force exerted by the ring against the walls of the groove, and inasmuch as the slots 26 and 27 occupy the greater portion of the circumference of the ring, the expansive force exerted by the ring will increase substantially in proportion to the increase in fluid pressure within the groove 15. This action is particularly effective in installations where the housing revolves, as in dual rotation propellors where the outer section or housing revolves in one direction and the inner or shaft section revolves in the opposite direction, for in such installations centrifugal force increases the expansive force exerted by the oil in the slots. Thus the sealing force will be maintained at substantially the proper value under widely varying pressure conditions.

From the foregoing description of a preferred form of our invention, it will be seen that we have provided a simple and compact seal which will effectively prevent leakage along rotating shafts. As the seal is constructed entirely of metal, it is subject to little wear, and its structure is such that it is able to withstand severe operating conditions, wide variations in temperature and great vibration without damage to the seal or substantal loss of efficiency. The seal automatically compensates for the small amount of wear that may take place, and the sealing pressures are maintained at correct values regardless of variations in the fluid pressure being retained. The axial resilience of the seals permits slight endwise vibration of the shafts without substantial loss of fluid, and as the sealing rings are slideable with respect to the sleeves or housing, substantial axial movements of the shafts with respect to the housing can be accommodated without damage to the seal. Because of their simple construction, the seals can be manufactured at reasonable cost and they are extremely compact and light in weight.

Various changes and modifications may be made in the invention without departing from the spirit or scope thereof. It is therefore to be understood that our patent is not limited to the preferred form of the invention described herein or in any manner other than by the scope of the appended claim.

We claim:

In a seal for preventing leakage of fluid between a rotating shaft and an opening through which the shaft extends, said shaft being provided with an annular groove, a transversely split metallic ring surrounding the shaft and having end faces in sealing engagement with the walls of said groove, said ring being provided with two rows of staggered circumferential slots to impart axial resilience thereto, and an expander spring disposed in said groove within said ring and expanding the ring outwardly, said ring being provided with an inwardly projecing bead disposed between said rows of slots and said spring engaging said bead at circumferentially spaced regions thereon, whereby the axial resiliency of said ring is not substantially impaired by the action of said spring.

FREDRICK G. FERGUSON.
RALPH C. THOMPSON.

REFERENCES CITED

The following references are of record in the file of this patent:

UNITED STATES PATENTS

| Number | Name | Date |
|---|---|---|
| 1,413,521 | Davis | Apr. 18, 1922 |
| 1,439,845 | Seib et al. | Dec. 26, 1922 |
| 1,853,200 | Buchmann | Apr. 12, 1932 |
| 2,348,939 | Thompson | May 16, 1944 |